United States Patent [19]
Kilburn

[11] Patent Number: 5,261,788
[45] Date of Patent: Nov. 16, 1993

[54] CEILING FAN AND BLADE ASSEMBLY

[76] Inventor: Robert Kilburn, 2075 S. Cayuse Trail, Cottonwood, Ariz. 86326

[21] Appl. No.: 976,567

[22] Filed: Nov. 16, 1992

[51] Int. Cl.$^5$ .............................. F01D 25/00
[52] U.S. Cl. .................................... 416/5
[58] Field of Search ...................... 416/5, 223 R

[56] References Cited

U.S. PATENT DOCUMENTS

| | | | |
|---|---|---|---|
| 1,337,560 | 4/1920 | Kohn | 416/5 |
| 1,699,201 | 1/1929 | Guth | 416/5 |

FOREIGN PATENT DOCUMENTS

| | | | |
|---|---|---|---|
| 198076 | 12/1905 | Fed. Rep. of Germany | 416/5 |
| 16197 | 1/1988 | Japan | 416/5 |

Primary Examiner—John T. Kwon
Attorney, Agent, or Firm—Leon Gilden

[57] ABSTRACT

A ceiling fan includes a drive motor having a first web rotatably mounted relative to a mounting boss securing the drive motor. A second web is mounted in a parallel spaced relationship below the first web in a coaxially aligned relationship relative to the drive motor and mounting boss. A plurality of blade loops are directed from the first web to the second web, wherein each blade loop includes an upper blade and lower blade of a predetermined pitch to effect displacement of air within a predetermined environment.

3 Claims, 4 Drawing Sheets

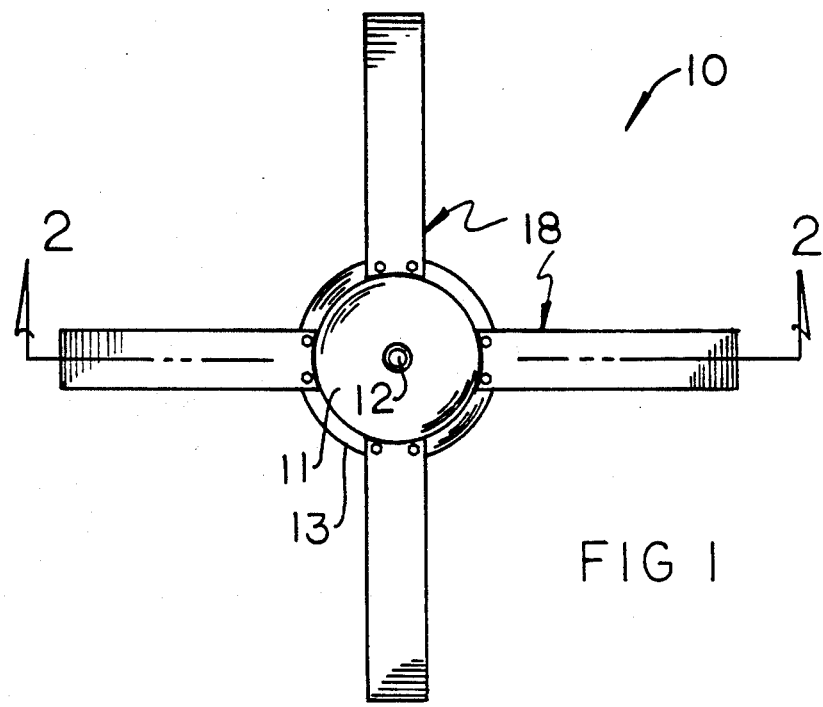
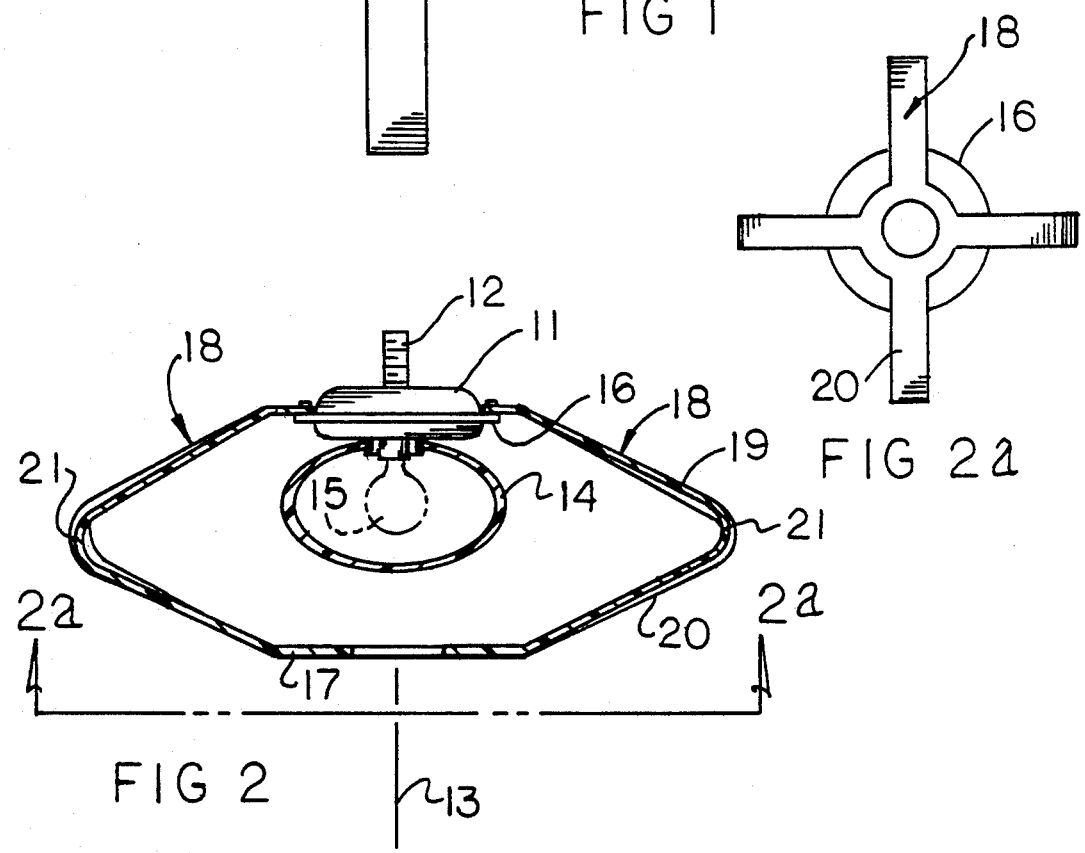

CEILING FAN AND BLADE ASSEMBLY

BACKGROUND OF THE INVENTION

1. Field of the Invention

The field of invention relates to ceiling fan structure, and more particularly pertains to a new and improved ceiling fan and blade assembly wherein the same is arranged to employ and efficient orientation of blade loops in lieu of conventional planar blade members.

2. Description of the Prior Art

Ceiling fans of various types have been utilized throughout the prior art, such as indicated in U.S. Pat. Nos. 4,662,823; 4,900,236; and 4,936,751.

The prior art has heretofore utilized planar blade structures projecting relative to a rotary motor mechanism, wherein the instant invention attempts to provide for blade construction enhancing air movement in orientation relative to the fan, as well as minimizing shadows and the like utilizing a centrally oriented illumination source and in this respect, the present invention substantially fulfills this need.

SUMMARY OF THE INVENTION

In view of the foregoing disadvantage inherent in the known types of ceiling fan apparatus now present in the prior art, the present invention provides a ceiling fan and blade assembly wherein the same employs blade loops mounted and extending from upper and lower webs relative to a rotary fan member. As such, the general purpose of the present invention, which will be described subsequently in greater detail, is to provide a new and improved ceiling fan and blade assembly which has all the advantages of the prior art ceiling fan apparatus and none of the disadvantages.

To attain this, the present invention provides a ceiling fan including a drive motor having a first web rotatably mounted relative to a mounting boss securing the drive motor. A second web is mounted in a parallel spaced relationship below the first web in a coaxially aligned relationship relative to the drive motor and mounting boss. A plurality of blade loops are directed from the first web to the second web, wherein each blade loop includes an upper blade and lower blade of a predetermined pitch to effect displacement of air within a predetermined environment.

My invention resides not in any one of these features per se, but rather in the particular combination of all of them herein disclosed and claimed and it is distinguished from the prior art in this particular combination of all of its structures for the functions specified.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. Those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent of legal terms or phraseology, to determine quickly from a cursory inspection the nature and essence of the technical disclosure of the application. The abstract is neither intended to define the invention of the application, which is measured by the claims, nor is it intended to be limiting as the scope of the invention in any way.

It is therefore an object of the present invention to provide a new and improved ceiling fan and blade assembly which has all the advantages of the prior art ceiling fan apparatus and none of the disadvantage.

It is another object of the present invention to provide a new and improved ceiling fan and blade assembly which may be easily and efficiently manufactured and marketed.

It is a further object of the present invention to provide a new and improved ceiling fan and blade assembly which is of a durable and reliable construction.

An even further object of the present invention is to provide a new and improved ceiling fan and blade assembly which is susceptible of a low cost of manufacture with regard to both materials and labor, and which accordingly is then susceptible of low prices of sale to the consuming public, thereby making such ceiling fan and blade assemblies economically available to the buying public.

Still yet another object of the present invention is to provide a new and improved ceiling fan and blade assembly which provides in the apparatuses and methods of the prior art some of the advantages thereof, while simultaneously overcoming some of the disadvantages normally associated therewith.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is an orthographic top view of the instant invention.

FIG. 2 is an orthographic side view of the invention.

FIG. 2a is an orthographic view, taken along the lines 2a—2a of FIG. 2 in the direction indicated by the arrows.

DESCRIPTION OF THE PREFERRED EMBODIMENT

Figure 4:
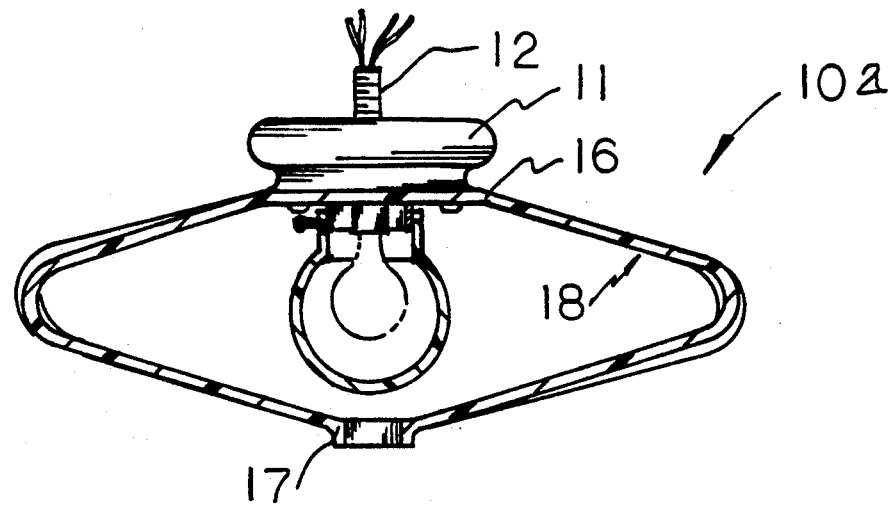
FIG. 4 is an orthographic view, taken along the lines 4—4 of FIG. 3 in the direction indicated by the arrows.
Figure 3:
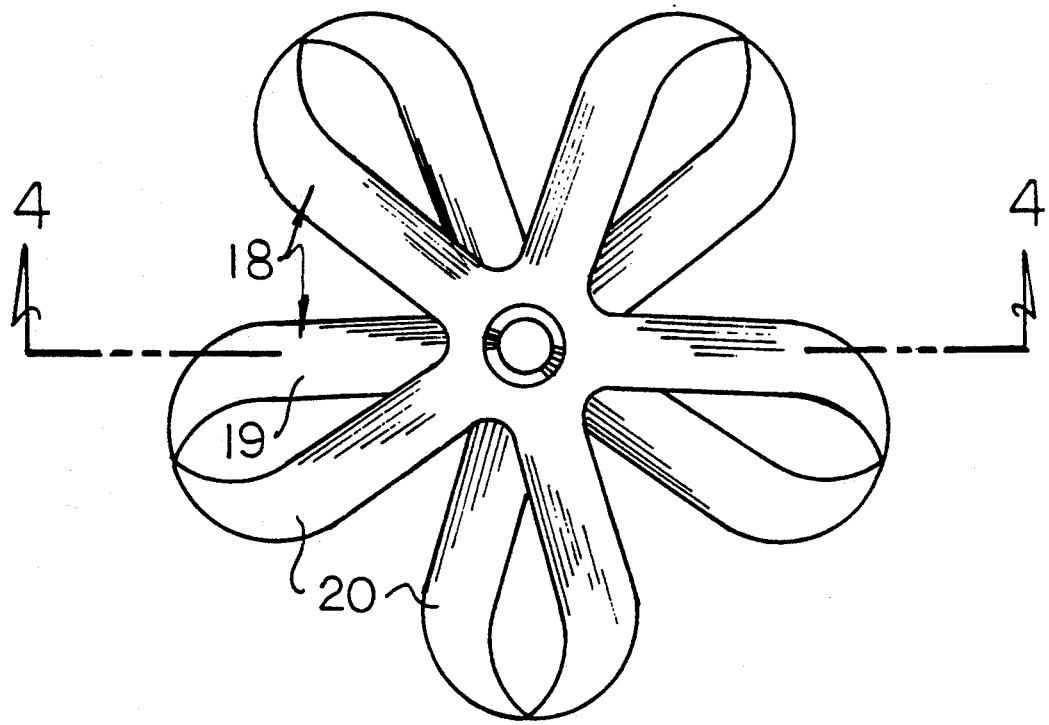
FIG. 3 is an orthographic bottom view of a further configuration of the blade loops of the invention.
Figure 5:
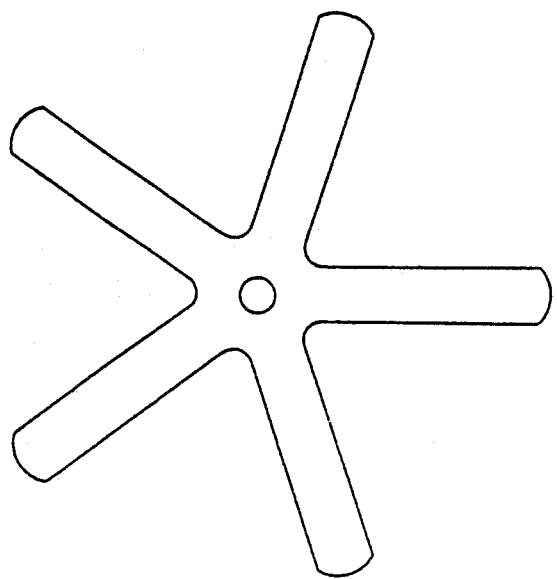
FIGS. 5, 6, 7, 8, 9 10, 11, and 12 are further examples of fan blade loop density utilized by the invention.
Figure 6:
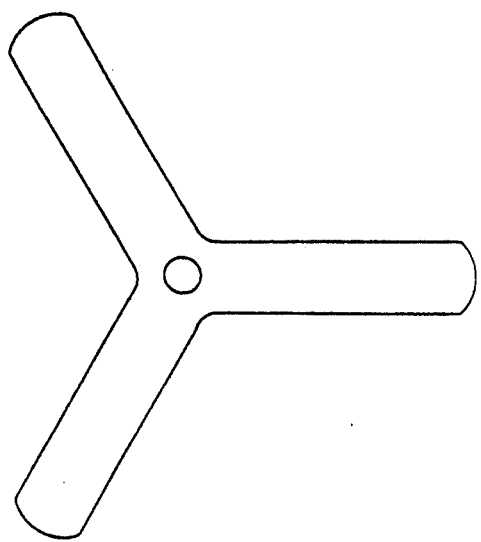
Figure 7:
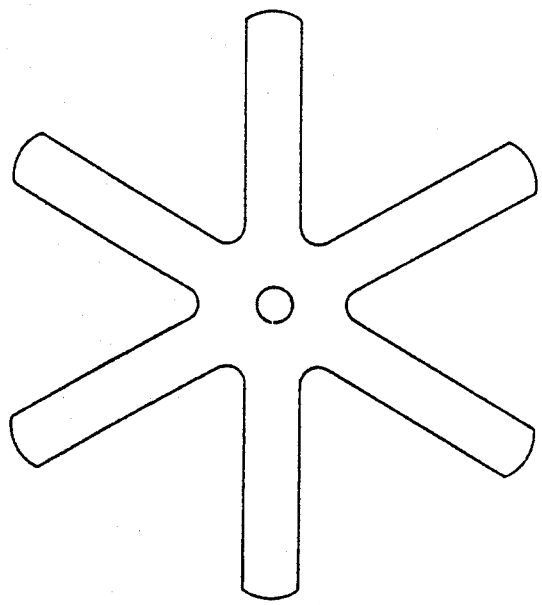
Figure 8:
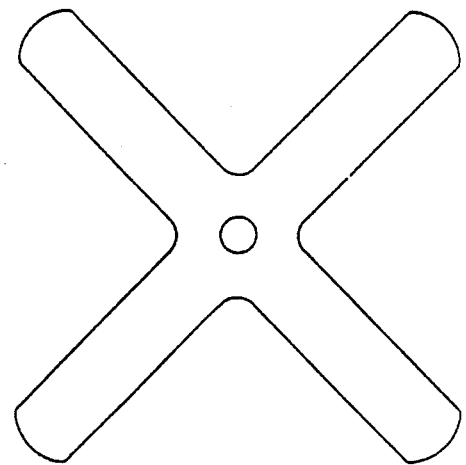
Figure 9:
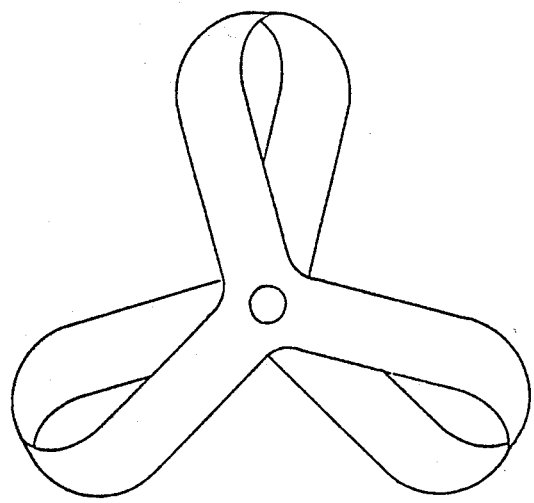
Figure 10:
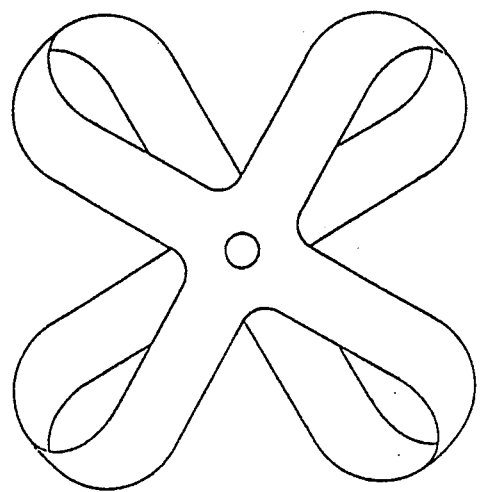
Figure 11:
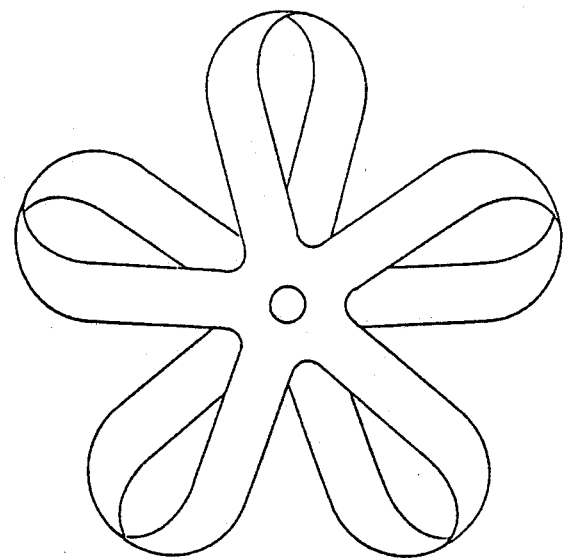
Figure 12:
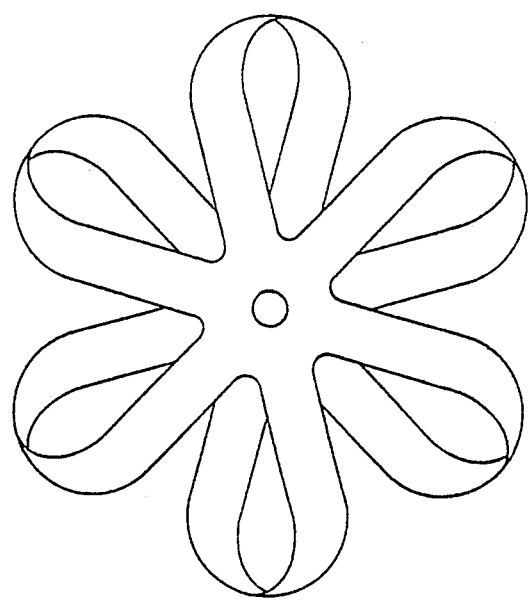

With reference now to the drawings, and in particular to FIGS. 1 to 12 thereof, a new and improved ceiling fan and blade assembly embodying the principles and concepts of the present invention and generally designated by the reference numeral 10 will be described.

More specifically, the ceiling fan and blade assembly 10 of the instant invention essentially comprises a fan drive motor 11 having a mounting boss 12 to mount the motor to a convention ceiling structure, as exemplified in the U.S. Pat. No 4,662,823 incorporated herein by reference. The drive motor 11 is mounted by mounting boss 12 about a ceiling fan axis 13 coaxially aligned to the mounting boss 12 relative to the drive motor 11. A lens housing 14 is mounted fixedly to a bottom surface of the drive motor 11 coaxial and relative to the axis 13, having an illumination bulb 15 positioned medially and coaxially of the housing 14. The drive motor 11 includes a first web 16 orthogonally oriented relative to the axis 13 and medially intersected thereby. A second web 17 is positioned below in a spaced parallel relationship relative to the first web 16 orthogonally and medially intersected by the axis 13, with a plurality of fan blade loops 18 symmetrically extending from the first web 16 to the second web 17 at equally spaced intervals utilizing various patterns, such as indicated in the FIGS. 5-12.

Each of the fan blade loops 18 is of a transparent material having a planar upper blade 19 extending from the first web 16 coextensively with a planar lower blade 20. The upper and lower blades 19 and 20 are pitched to effect air movement, with an arcuate transition web 21 extending between the upper and lower blade members to secure them in a fixed orientation relative to one another and to the fan assembly. The blade loops 18 are transparent to permit illumination therethrough minimizing shadow in utilization of the organization. It should be noted that the blades may be of right or left pitch in consistency relative to one another dependent upon fan motor rotation, wherein alternatively, a reversible fan motor may be utilized relative to a predetermined pitch of the blades. Further, the blade structure may be adapted to conventional fan members of free-standing configuration if so desired.

It should be noted for example that the blade construction of the instant invention may be employed by various mechanical devices in other areas such as automotive blades, agricultural blades, and the like. Further, various colorations such as transparency, semi-transparent, opaque, and the like may be employed relative to the utilization of the device relative to air circulation, cooling, energy generation, and propulsion relative to blade structure.

As to the manner of usage and operation of the instant invention, the same should be apparent from the above disclosure, and accordingly no further discussion relative to the manner of usage and operation of the instant invention shall be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A ceiling fan and blade assembly, comprising,
   a drive motor, the drive motor having a mounting boss, and
   an illumination lens housing mounted to the drive motor below the mounting boss, wherein the illumination housing, the mounting boss, the drive motor are coaxially aligned about a predetermined axis, with an illumination bulb mounted within the illumination housing, and
   the drive motor having a first web, and
   the first web orthogonally oriented to and medially intersected by the predetermined axis, and
   a second web oriented below in a parallel spaced relationship relative to the first web, and
   blade members mounted to the first web and the second web, and
   the blade members include individual fan blade loops, wherein each fan blade loop of said fan blade loops extends from the first web to the second web, with each fan blade loop having a planar upper blade loop and a planar lower blade loop, with the planar upper blade loop and the planar lower blade loop oriented relative to one another having an acute included angle therebetween, with an arcuate transition web fixedly mounting the upper blade loop to the lower blade loop.

2. A ceiling fan and blade assembly as set forth in claim 1 wherein each of the fan blade loops are transparent.

3. A ceiling fan and blade assembly as set forth in claim 2 comprising a plurality of blade members including individual fan blade loops, wherein each fan blade loop of said fan blade loops is arranged relative to a central web, wherein each fan blade loop is mounted to the central web, and each fan blade loop includes a planar upper blade loop and a planar lower blade loop, with the planar upper blade loop and the planar lower blade loop oriented relative to one another, and an arcuate transition web fixedly mounted to the upper blade loop and the lower blade loop spaced from the central web.

* * * * *